US006643619B1

(12) United States Patent
Linhard et al.

(10) Patent No.: US 6,643,619 B1
(45) Date of Patent: Nov. 4, 2003

(54) METHOD FOR REDUCING INTERFERENCE IN ACOUSTIC SIGNALS USING AN ADAPTIVE FILTERING METHOD INVOLVING SPECTRAL SUBTRACTION

(76) Inventors: Klaus Linhard, Gundershofen 86, D-89603 Schelklingen (DE); Tim Haulick, Nelly-Sachs-Strasse 75, D-89131 Blaustein (DE)

( * ) Notice: Subject to any disclaimer, the term of this patent is extended or adjusted under 35 U.S.C. 154(b) by 0 days.

(21) Appl. No.: 09/530,527

(22) PCT Filed: Oct. 22, 1998

(86) PCT No.: PCT/EP98/06707

§ 371 (c)(1), (2), (4) Date: Jun. 20, 2000

(87) PCT Pub. No.: WO99/23642

PCT Pub. Date: May 14, 1999

(30) Foreign Application Priority Data

Oct. 30, 1997 (DE) ........................................ 197 47 885

(51) Int. Cl.[7] ................................................ G10L 15/20

(52) U.S. Cl. ....................... 704/233; 704/240; 704/226; 704/227; 704/210; 704/214; 381/94.3; 381/94.1

(58) Field of Search ................................ 704/233, 226, 704/227, 228, 210, 214, 219, 230, 234, 200, 207, 240, 253; 379/406.08; 381/94.1, 94.2, 94.3, 94.7

(56) References Cited

U.S. PATENT DOCUMENTS

| | | | | | |
|---|---|---|---|---|---|
| 4,630,305 | A | * | 12/1986 | Borth et al. | 381/94.3 |
| 5,251,263 | A | * | 10/1993 | Andrea et al. | 381/71.6 |
| 5,544,250 | A | * | 8/1996 | Urbanski | 381/94.3 |
| 5,659,622 | A | * | 8/1997 | Ashley | 381/94.1 |
| 5,668,927 | A | * | 9/1997 | Chan et al. | 704/240 |
| 5,699,480 | A | * | 12/1997 | Martin | 704/205 |
| 5,768,473 | A | * | 6/1998 | Eatwell et al. | 704/226 |
| 5,806,025 | A | * | 9/1998 | Vis et al. | 704/226 |
| 5,943,429 | A | * | 8/1999 | Handel | 381/94.2 |
| 5,974,373 | A | * | 10/1999 | Chan et al. | 704/200 |
| 6,415,253 | B1 | * | 7/2002 | Johnson | 704/210 |
| 6,510,408 | B1 | * | 1/2003 | Hermansen | 704/233 |

FOREIGN PATENT DOCUMENTS

| | | |
|---|---|---|
| WO | 95/15550 | 6/1995 |
| WO | 97/10586 | 3/1997 |

OTHER PUBLICATIONS

Steven F. Boll, "Suppression of Acoustic Noise Speech Using Spectral Subtraction," IEEE Transactions on Acoustics, Speech, and Signal Processing, vol. ASSP–27, No. 2, Apr. 1979, pp. 113 to 120.

Klaus Linhard, "Adaptive Geraeuschreduktion im Frequenzbereich bei Sprachuebertragung," Dissertation, Univeritaet Fridericiana Karlsruhe, 1988, pp. 41 to 45*.

Yariv Ephraim, "Speech Enhancement Using a Minimum Mean–Square Error Short–Term Spectral Amplitude Estimator," IEEE Transactions of Acoustics, Speech, and Signal Processing, vol. ASSP–32, No. 6, Dec. 1984, pp. 1109 to 1121.

Peter Vary, "On the Enhancement of Noisy Speech," Signal Processing II: Theories and Applications, H.W. Schuessler (Ed.), Elsevier Science Publishers B.V. (North–Holland), 1983, pp. 327 to 330.

* cited by examiner

*Primary Examiner*—Vijay Chawan
(74) *Attorney, Agent, or Firm*—Kenyon & Kenyon

(57) ABSTRACT

A method for reducing interference in acoustic signals by using of an adaptive filter method involving spectral subtraction. The inventive method enables a significant reduction of interference in acoustic signals, especially voice signals, without causing any substantial falsification of said signals such as echo or musical tones, and significantly reduces computational requirements in comparison with other methods known per se that are similarly designed to improve signal quality.

19 Claims, 2 Drawing Sheets

METHOD FOR REDUCING INTERFERENCE IN ACOUSTIC SIGNALS USING AN ADAPTIVE FILTERING METHOD INVOLVING SPECTRAL SUBTRACTION

FIELD OF THE INVENTION

The present invention relates to a method for reducing interference in acoustic signals using of an adaptive filtering method involving spectral subtraction.

RELATED TECHNOLOGY

Use of an adaptive filtering method involving spectral subtraction for reducing interference is described, for example, in Boll, "Suppression of Acoustic Noise in Speech using Spectral Subtraction"; IEEE Trans. Acoust. Speech a. Signal Processing, Vol. ASSP-27, No. 2, p. 113–120, 1979.

The improvement of speech signals is a central part of the current research in the field of communications technology, for example, also in fields of application such as handsfree talking in vehicles or in automatic speech recognition. For the improvement of speech signals, it is above all essential to reduce the disturbing noises.

A method frequently used for reducing noise is the "spectral subtraction" whose basic principles are described, for example, Boll supra.

The spectral subtraction is an adaptive filter which ascertains (learns) an average value of the noise spectrum during speech pauses, and continually subtracts this spectrum from the disturbed speech signal. The exact embodiment of the subtraction of the interference spectrum can be varied depending on the requirement. Individual examples are depicted in the following.

As a rule, the filtering method of spectral subtraction is carried out within the frequency range. The signals a transformed segmentwise into the frequency range by an FFT (Fast Fourier Transform). The corresponding segments of the signal in the time range are half overlapped, and are previously multiplied by a Hanning window. The synthesis is carried out after the filtering (multiplication) and subsequent inverse transformation by the "overlap-add method".

In Linhard, "Adaptive Gerauschreduktion im Frequenzbereich bei Sprachutbertragung"; Dissertation Universitat Karslruhe, 1988 [Adaptive Noise Reduction within the Frequency Range During Speech Transmission; dissertation, University of Karlsruhe, 1988] three standard filter curves are depicted as exemplary embodiments for the spectral subtraction:

$$\text{Power Subtraction: } H(k,i)=\max(b, \sqrt{1-\alpha\cdot NIR}) \quad (1)$$

$$\text{Wiener Filter: } H(k,i)=\max(b, (1-\alpha\cdot NIR)) \quad (2)$$

$$\text{Magnitude Subtraction: } H(k,i)=\max(b, (1-\alpha\cdot\sqrt{\mathrm{NIR}})) \quad (3)$$

k and i designate the discrete time and the discrete frequency. NIR is the noise-input ratio.

$$NIR=E[N(i)^2]/(S(k,i)+N(k,i))^2 \quad (4)$$

S and N designate the speech signal or the interference, respectively; a is an overestimation factor by which the noise can be overestimated, and b is the "spectral floor" which represents the minimum of the filtering function. Here, it is assumed that the speech pauses can be detected sufficiently accurately. Consequently, it is possible to calculate estimation value $E[N(i)^2]$ and, from that, NIR. Simple standard methods use a value 1<=a<4 and 0.1<b<0.3 for reducing the remaining residual noise, the so-called "musical tones". A disadvantage in doing this, however, is always an undesired but inevitable compromise between residual noise suppression and speech distortion. A suppression of the 'musical tones' which is markedly improved compared to the method depicted in to Linhard, supra, is proposed in Ephraim, Malah, "Speech Enhancement using a Minimum Mean-Square Error Short-Time Spectral Amplitude Estimator"; IEEE Trans. Acoust. Speech a. Signal Processing, Vol. ASSP-32, No. 6, p. 1109–1121, 1984, which is hereby incorporated by reference herein. There, information on an a priori (earlier) and an a posteriori (later) signal-to-noise ratio is utilized for modifying the filter curves, here Bessel functions. A priori and a posteriori signal-to-noise ratios Rprio and Rpost are here calculated as $$X(k,i)=S(k,i))+N(k,i) \quad (5)$$

$$Rpost(k,i)=|X(k,i)|^2/E[N(i)^2]-1 \quad (6)$$

$$Rprio(k,i)=(1-d)P[Rpost(k,i)]+d\backslash H(k-1,i)X(k-1,i)|^2/E[N(i)^2] \quad (7)$$

Where d is a smoothing constant, and 0.99<d<1.P[ ] is a projection by which negative components are set to zero. By selecting d close to value one, the transient oscillation into a beginning, high-energy speech signal is slowed down. Projection P results in a smoothing out of the residual noise during speech pauses. However, this is not required for preventing musical tones, and may have an unnatural effect. Moreover, the outlay required for implementing this method is considerable and, in the case of speech signals, an audible reverberation characteristic may occur. The reverberation characteristic ensues from the fact that H(k−1,i) und X(k−1,i) enter into the current filter curve from previous segment k−1 via Rprio at instant k.

SUMMARY OF THE INVENTION

Therefore, an object of the present invention is to provide a method which, on one hand, allows interferences in acoustic signals, particularly in speech signals to be markedly reduced using the adaptive filtering method of spectral subtraction without causing an essential corruption of the signal such as reverberation, and which, on the other hand, allows the computational requirement to be considerably reduced relative to already known and, with regard to the quality of the achieved signal improvement, comparable methods.

The present invention provides method for reducing interference in acoustic signals by using an adaptive filtering method involving spectral subtraction, in which achieved according to the present invention in that the calculation of an, in each case current characteristic value H(k,i) of the used filtering function considering information on an a priori signal-to-noise ratio is carried out in such a manner that characteristic values H(k−j,i), j=1, . . . , N of the filtering function from preceding time segments k−j are used as the sole information on the a priori signal-to-noise ratio, however, at least one characteristic value $H(k-j_0,i)$, $j_0 \in 1, \ldots, N$ of the filtering function from a preceding time segment $k-j_0$ is used; and that the characteristic curve of the filtering function is split into two parts and has a break edge such

- that the filtering for heavily disturbed signals X(k,i) having a high noise-input ratio NIR(k,i) results in a signal-independent strong damping; and
- that the filtering for slightly disturbed signals X(k,i) having a low noise-input ratio NIR(k,i) results in a signal-dependent low damping.

The advantages of such an embodiment are that, first of all, the acoustic quality of the noise-suppressed signal is improved to a greater extent than in the method described under Ephraim, supra, namely by feeding back one or a plurality of characteristic values H(k−j,i) alone for considering information preceding in time in contrast to the feeding back of characteristic value H(k−1,i) and disturbed signal X(k−1,i) proposed in Ephraim, supra; and, by decoupling or decorrelating H and X by considering H(k−j,i) and X(k, i) at different instants k−j and k according to the present invention, as a result of which reverberation and echos are minimized; and in that, during time segments having a high noise-input ratio NIR(k,i), for example, background noises during speech pauses, the signals are damped only independently of the signal but reproduced naturally whereas in Ephraim, supra, they are smoothed and corrupted in a manner that they are unnatural; and in that the transient oscillation of the characteristic curve into a beginning signal takes place markedly faster than in Ephraim, supra, where the transient oscillation is strongly slowed down by introducing smoothing constant d and setting its value close to 1; and that, secondly, the computational requirement is considerably smaller than in the method described in Ephraim supra because, in comparison Ephraim, supra, the calculation of the a posteriori signal-to-noise ratio is dropped, and because the consideration of the a priori signal-to-noise ratio is considerably simplified by dropping the smoothing and the projection; and because during time segments in which the signals have a high a high noise-input ratio NIR(k,i), no signal-dependent filter curve value is calculated at all, but simply a fixing to a signal-independent value is carried out.

In an advantageous embodiment of the present invention regarding the method for reducing interference in acoustic signals by means of an adaptive filtering method involving spectral subtraction, characteristic value H(k−1,i) of the filtering function from immediately preceding time segment k−1 is used as the sole information on the a priori signal-to-noise ratio.

Advantages of this embodiment include that it already allows a high-quality reduction of interferences to be achieved, and that the computational requirement for carrying out the method is minimal.

In a further advantageous embodiment of the present invention regarding the method for reducing interference in acoustic signals by means of an adaptive filtering method involving spectral subtraction, current characteristic value H(k,i) of the filtering function is calculated from signal-dependent noise-input ratio NIR(k,i), and the information on the a priori signal-to-noise ratio is considered in such a manner that noise-input ratio NIR(k,i) is replaced with a corrected noise-input ratio $$NIR'(k,i) := NIR(k,i) \Big/ \sum_{j=1}^{N} w_j H(k-j,i) \tag{8}$$

prior to calculating current characteristic value H(k,i), weighting factors $w_j$ being real numbers smaller than 1, and N being a natural number greater than or equal to 1.

The advantages of this embodiment are that it allows a high-quality reduction of interferences to be achieved, and that the computational requirement for carrying out the method is very small.

In a further advantageous embodiment of the present invention regarding the method for reducing interference in acoustic signals by means of an adaptive filtering method involving spectral subtraction, $$H(k,i)=\max(b, \sqrt{1-\alpha\cdot NIR'(k,i)}), \text{ or} \tag{9}$$

$$H(k,i)=\max(b, (1-\alpha\cdot NIR'(k,i))), \text{ or} \tag{10}$$

$$H(k,i)=\max(b, (1-\alpha\cdot\sqrt{NIR'(k,i)})) \tag{11}$$

are used as filtering function;

a and b being positive real numbers, a preferably being an element of the interval from 1 to 4 b preferably being an element of the interval from 0.1 to 0.3

Advantages of this embodiment include that it allows a high-quality reduction of interferences to be achieved, and that the computational requirement for carrying out the method is considerably less than, for example, when using the Bessel functions proposed in Ephraim, supra. Above all, when reducing interferences of speech signals, it has turned out to be beneficial to select parameters a and b preferably from the mentioned intervals.

In a further advantageous embodiment of the present invention regarding the method for reducing interference in acoustic signals by means of an adaptive filtering method involving spectral subtraction, the position of the break edge of the filter curve is adapted to the disturbed signal, preferably in such a manner that the position of the break edge during the filtering of signals having a high frequency differs from the position of the break edge during the filtering of signals having a lower frequency and/or that the position of the break edge during the filtering of speech signals differs from the position of the break edge during the filtering of speech pauses.

In the case of speech signals, the higher frequencies have on average less energy than the lower frequencies. However, the higher frequencies play an important part in the understandability of speech. By the selection of the position of the break edge, it is possible for higher frequencies to be given preference, for example, to be damped to a lower degree, which contributes to the improvement of the subjective quality of speech.

In a further advantageous embodiment of the present invention regarding the method for reducing interference in acoustic signals by means of an adaptive filtering method involving spectral subtraction, the position of the break edge of the filter curve is adapted to the disturbed signal in such a manner that noise-input ratio NIR(K,i) is replaced with a corrected noise-input ratio $$NIR'(k,i) := NIR(k,i) \Big/ \left[ c(i) + (1-c(i)) \sum_{j=1}^{N} w_j H(k-j,i) \right] \tag{12}$$

prior to calculating current characteristic value H(k,i), weighting factors $w_j$ being real numbers smaller than 1, and N being a natural number greater than or equal to 1;

preferably in such a manner that noise-input ratio NIR (K,i) is replaced with a corrected noise-input ratio $$NIR'(k,i):=NIR(k,i)/[c(i)+(1-c(i))H(k-1,i)] \tag{13}$$

prior to calculating the current characteristic value H(k,i).

Advantages of this embodiment include that it allows the above-mentioned displacement of the position of the break edge to be attained in a simple manner, in particular in the secondly-mentioned preferred embodiment.

In a further advantageous embodiment of the present invention regarding the method for reducing interference in acoustic signals by means of an adaptive filtering method involving spectral subtraction, characteristic filter value or values H(k−j,i) from preceding time segments k−j required for calculating current corrected noise-input ratio NIR'(k,i) are initially corrected themselves in the form $$H'(k-j,i):=f_j H(k-j,i)^{e_j},\ F_j \text{ and } e_j \text{ real numbers} \tag{14}$$

prior to calculating noise input-ratio NIR'(k,i).

Speech quality is a subjective concept which can be given attributes such as naturalness, freedom of distortion, freedom of noise, low-fatigue listening, etc. A disturbing noise can have very differing time and/or spectral characteristics, depending on its type. A parametrization according to equation (14), via additional degrees of freedom or parameters e and f, makes it possible for the feedback mechanism to be influenced, thus allowing the subjective quality of speech and the residual interferences to be changed.

The method for reducing interference in acoustic signals by means of an adaptive filtering method involving spectral subtraction turns out to be particularly advantageous in the above-mentioned specific embodiments when used for reducing interferences in speech signals.

BRIEF DESCRIPTION OF THE DRAWINGS

In the following, the method according to the present invention for reducing interference in acoustic signals by means of an adaptive filtering method involving spectral subtraction is explained in greater detail on the basis of exemplary embodiments shown in the drawing, in which.

Here, it is assumed that the signal pauses, in this exemplary embodiment the speech pauses, can be detected sufficiently accurately. Then, the system for reducing noise can be initialized by the pause noise. Here, spectral floor b is determined from the average noise value of the pause noise, and the initial characteristic value of filtering function H(0,i) is set to b. This can be carried out for a plurality of different spectral lines having different frequencies i. The system is adapted during each new speech pause.

Figure 1:
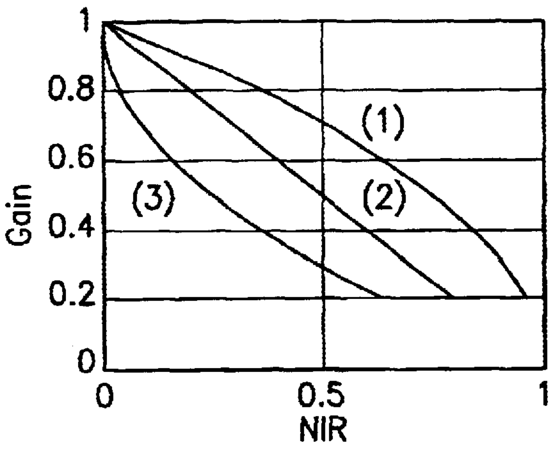
Fig. 1 PRIOR ART
FIG. 1 shows the characteristic curves of standard filtering functions (1) through (3) known from the literature.

Referring to FIG. 1, the value of the characteristic value H of the filtering function at an instant k and at frequency i is designated as 'gain'. Here, the spectral floor is fixed to value 0.2. Characteristic value H of the filtering function (gain) decreases as the interference increases, i.e., as noise-input ration NIR increases.

Figure 2:
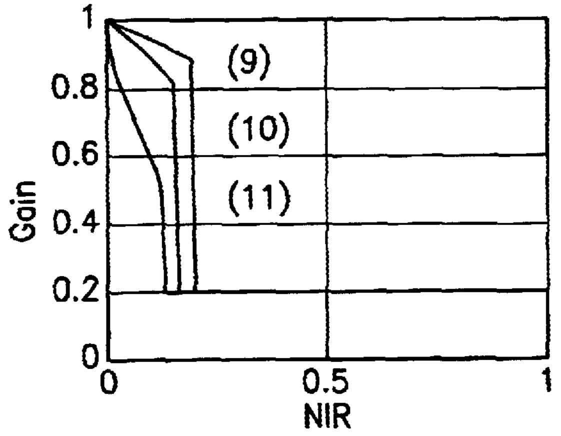
FIG. 2 shows the characteristic curves of standard filtering functions (9) through (11) modified according to the present invention.

In the exemplary embodiment shown in FIG. 2 the information on an a priori signal-to-noise ratio is considered in such a manner that characteristic value H(k−1,i) of the respective filtering function from immediately preceding time segment k−1 is used as the sole information on the a priori signal-to-noise ratio. Compared with FIG. 1, the sharp break edge which divides the filtering function into two regions is particularly striking: one region for the signal-independent strong damping for filtering heavily disturbed signals X(k,i) having a high noise-input ratio NIR(k,i), and one for the signal-dependent low damping for filtering slightly disturbed signals X(k,i) having a low noise-input ratio NIR(k,i).

Figure 3:
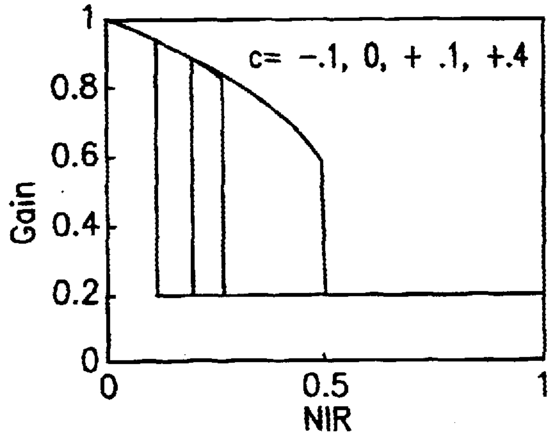
FIG. 3 shows the effects of changing parameter c(i) according to equation (13) on the position of the break edge of the filter curve of power subtraction (9)

Referring to FIG. 3, as the value of the parameter c(i) increases, the position of the break edge shifts towards higher noise-input ratio Ratios NIR(k,i), and the filter is 'switched off' later.

Figure 4:
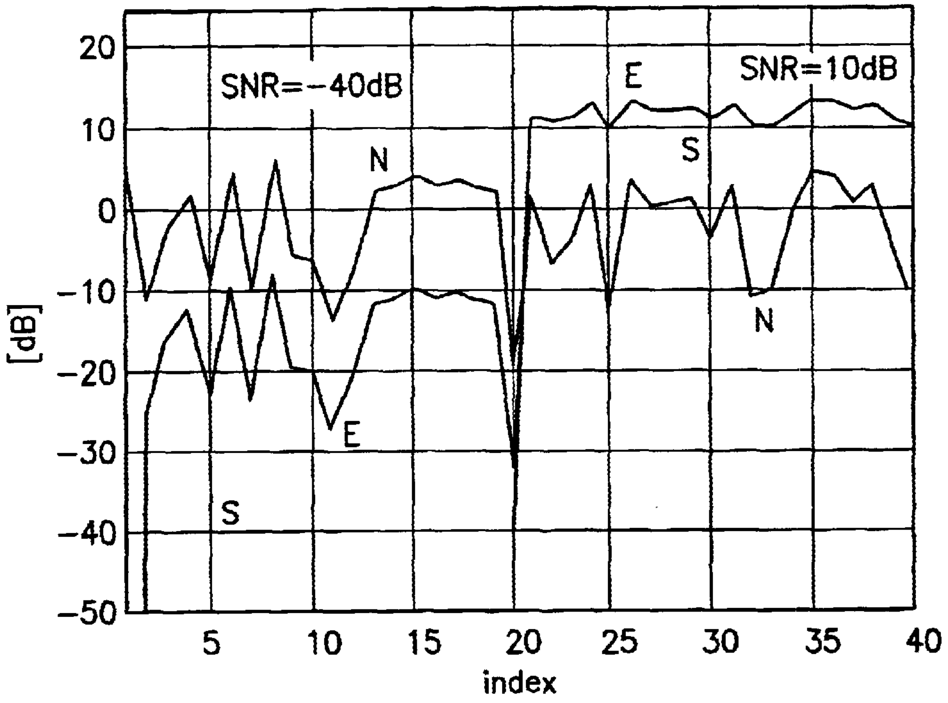
FIG. 4 shows the effects of a filtering modified according to the present invention on disturbed speech signal X, here via power subtraction according to equation (9)
Figure 5:
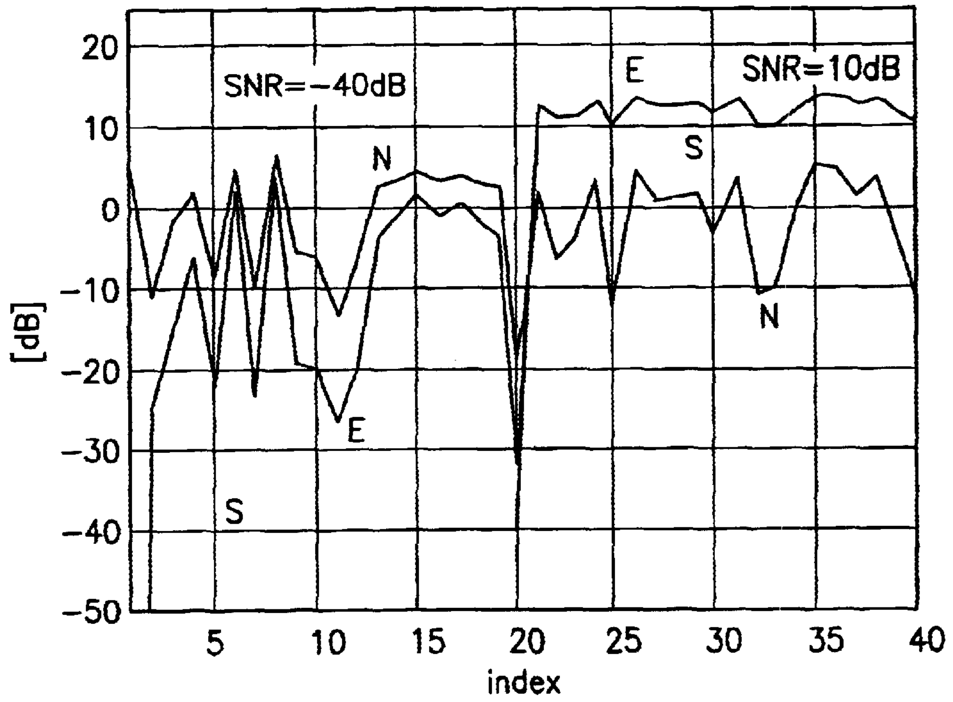
FIG. 5 shows the effects of the standard filtering via power subtraction according to equation (1) on the same disturbed speech signal as that shown in FIG. 4.

Graphically illustrated in both FIGS. 4 and 5 are the same disturbed speech signal X as well as effects of different filterings on speech estimation value E. During the first 20 time cycles, speech level S lies at a minimal value of −40 dB, and then abruptly increases to a value of 10 dB from the $21^{st}$ time cycle on. During the entire measuring period, a disturbing noise N having a level of approximately 0 dB is superimposed.

By the filtering modified according to the present invention (FIG. 4), the full noise damping of 14 dB is attained during the speech pause, i.e., until the $_{20}{}^{st}$ time cycle (here designated as 'index'), corresponding to a spectral floor of b=0.2. With the beginning of speech signal S at the $21^{st}$ time cycle, the filtering modified according to the present invention switches the speech level through in a virtually undelayed manner and then filters/damps in a signal-dependent manner. Compared to that, FIG. 5 shows the effects of the standard filtering on the same disturbed speech signal. Here, during the speech pause, the damping of 14 dB is not attained during the irregularly occurring noise increases. This, can then be heard as musical tone. In contrast, FIG. 4 exhibits a constant pause damping, i.e., disturbing noise N is output in the natural form with a level which is 14 dB lower.

In the described specific embodiments, the method according to the present invention as well as the device turn out to be particularly suitable for reducing interferences in speech signals. Further conceivable uses ensue, for example, in the noise suppression in pieces of music, above all in the case of old recordings or other recordings having poor recording quality or other interference effects.

The present invention is not limited to the specific embodiments described above but, on the contrary, can be applied to other embodiments.

Thus, in lieu of filtering a single spectral line, it is conceivable, for example, to use a general approach for spectral analysis, for example, using a polyphase filter bank known from literature vary, "On the Enhancement of Noisy Speech", in "Signal Processing II" edited by Schussler, Elsevier Science Publishers B.V., p. 327–330, 1983, which is hereby incorporated by reference to then filter the signals of the filter bank using the same method.

Literature

[1] Boll, "Suppression of Acoustic Noise in Speech using Spectral Subtraction";

IEEE Trans. Acoust. Speech a. Signal Processing, Vol. ASSP-27, No. 2, p. 113–120, 1979

[2] Linhard, "Adaptive Geräuschreduktion im Frequenzbereich bei Sprachüibertragung"; Dissertation Universit ät Karslruhe, 1988 [Adaptive Noise Reduction within the Frequency Range During Speech Transmission; dissertation, University of Karlsruhe, 1988]

[3] Ephraim, Malah, "Speech Enhancement using a Minimum Mean-Square Error Short-Time Spectral Amplitude Estimator"; IEEE Trans. Acoust. Speech a. Signal Processing, Vol. ASSP-32, No. 6, p. 1109–1121, 1984

[4] Vary, "On the Enhancement of Noisy Speech", in "Signal Processing II" edited by Schussler, Elsevier Science Publishers B.V., p. 327–330, 1983

What is claimed is:

1. A method for reducing interference in disturbed acoustic signals using an adaptive filtering process including spectral subtraction, the method comprising:

filtering the signals in a plurality of respective time segments and a plurality of respective discrete frequencies i segmentwise using an adaptive filtering function;

determining a respective noise-input ratio for each of the plurality of respective time segments and respective discrete frequencies so that each respective noise-input ratio has a small respective value for signals having a relatively low disturbing noise component and a high respective value for signals having a relatively high disturbing noise component;

adapting the adaptive filtering function so that respective information on a respective a priori signal-to-noise ratio is used for a calculation of each of a plurality of characteristic values of the adaptive filtering function; and using at least one of the plurality of characteristic values from a respective at least one preceding time segment as the respective information on each respective a priori signal-to-noise ratio;

the adaptive filtering function having a characteristic curve including two parts and having a break edge positioned such that the filtering for signals having a high respective noise-input ratio results in a signal-independent relatively strong damping and the filtering for signals having a low noise-input ratio results in a signal-dependent relatively low damping.

2. The method as recited in claim 1 wherein in the using step the characteristic value from only the immediately preceding time segment is used as the information on the a priori signal-to-noise ratio.

3. The method as recited in claim 1 wherein each of the plurality of characteristic values is calculated using a respective corrected noise-input ratio, the respective corrected noise-input ratio being calculated using the respective noise-input ratio so as to use the information on the respective a priori signal-to-noise ratio.

4. The method as recited in claim 3 wherein each respective noise-input ratio is calculated using $$NIR'(k, i) := NIR(k, i) \Big/ \sum_{j=1}^{N} w_j H(k-j, i)$$

where NIR'(k, i) is the corrected noise-input ratio, NIR(k, i) is the noise-input ratio, k is the respective time segment, i is the respective frequency, H(k−j, i) is a respective one of the plurality of characteristic values, the weighting factors $w_j$ are real numbers smaller than 1, and N is a natural number greater than or equal to 1.

5. The method as recited in claim 3, wherein the filtering function is calculated using at least one of:

$$H(k,i)=\max(b, \sqrt{1-\alpha \cdot NIR'(k,i)});$$

$$H(k,i)=\max(b, (1-\alpha \cdot NIR'(k,i)) ); \text{ and}$$

$$H(k,i)=\max(b, (1-\alpha \cdot \sqrt{NIR'(k,i)}))$$

where NIR'(k, i) is the corrected noise-input ratio, k is the respective time segment, i is the respective frequency, H(k, i) is a respective one of the plurality of characteristic values, and a and b are positive real numbers.

6. The method as recited in claim 5 wherein a is an element of an interval from 1 to 4 and b is an element of an interval from 0.1 to 0.3.

7. The method as recited in claim 1 further comprising adapting the position of the break edge of the characteristic curve of the adaptive filtering function to the frequency of the signal being filtered.

8. The method as recited in claim 7 wherein each of the plurality of characteristic values is calculated using the respective noise-input ratio and wherein the adapting of the position of the break edge is performed by replacing each respective noise-input ratio with a respective corrected noise-input ratio for the calculating of the respective characteristic value.

9. The method as recited in claim 8 wherein the corrected noise-input ratio is calculated using:

$$NIR'(k, i) := NIR(k, i) \Big/ \left[ c(i) + (1 - c(i)) \sum_{j=1}^{N} w_j H(k-j, i) \right]$$

where NIR'(k, i) is the corrected noise-input ratio, NIR(K, i) is the noise-input ratio, k is the respective time segment, i is the respective frequency, H(k−j, i) is a respective one of the plurality of characteristic values, the weighting factors $w_j$ are real numbers smaller than 1, and N is a natural number greater than or equal to 1.

10. The method as recited in claim 9 wherein the corrected noise-input ratio is calculated using:

$$NIR'(k,i):=NIR(k,i)/[c(i)+(1-c(i))H(k-1,i)]$$

where NIR'(k, i) is the corrected noise-input ratio, NIR(k, i) is the noise-input ratio, k is the respective time segment, i is the respective frequency, and H(k−1, i) is the characteristic value from the immediately preceding characteristic value.

11. The method as recited in claim 8 further comprising correcting the respective characteristic values from the at least one preceding time segment prior to calculating each respective corrected noise-input ratio.

12. The method as recited in claim 11 wherein the correcting of each of the respective at characteristic values is performed using $$H'(k-j,i):=f_j H(k-j,i)^{e_j},$$

where H'(k−j, i) is a respective corrected characteristic value H(k−j, i), and $f_j$ and $e_j$ real numbers.

13. The method as recited in claim 1 further comprising adapting the position of the break edge as a function of a presence of a speech signal and a presence of a speech pause.

14. The method as recited in claim 13 wherein each of the plurality of characteristic values is calculated using the respective noise-input ratio and wherein the adapting of the position of the break edge is performed by replacing each respective noise-input ratio with a respective corrected noise-input ratio for the calculating of the respective characteristic value.

15. The method as recited in claim 14 wherein the corrected noise-input ratio is calculated using:

$$NIR'(k,i):=NIR(k,i)\Bigg/\left[c(i)+(1-c(i))\sum_{j=1}^{N}w_jH(k-j,i)\right]$$

where NIR'(k, i) is the corrected noise-input ratio, NIR(k, i) is the noise-input ratio, k is the respective time segment, i is the respective frequency, H(k−j, i) is a respective one of the plurality of characteristic values, the weighting factors $w_j$ are real numbers smaller than 1, and N is a natural number greater than or equal to 1.

16. The method as recited in claim 15 wherein the corrected noise-input ratio is calculated using:

$$NIR'(k,i):=NIR(k,i)/[c(i)+(1-c(i))H(k-1,i)]$$

where NIR'(k, i) is the corrected noise-input ratio, NIR(k, i) is the noise-input ratio, k is the respective time segment, i is the respective frequency, and H(k−1, i) is the characteristic value from the immediately preceding characteristic value.

17. The method as recited in claim 14 further comprising correcting the respective characteristic values from the at least one preceding time segment prior to calculating each respective corrected noise-input ratio.

18. The method as recited in claim 17 wherein the correcting of each of the respective at characteristic values is performed using $$H'(k-j,i):=f_jH(k-j,i)^{e_j},$$

where H'(k−j, i) is a respective corrected characteristic value H(k−j, i), and $f_j$ and $e_j$ real numbers.

19. The method as recited in claim 1 wherein the acoustic signals are speech signals.

* * * * *